May 12, 1953

J. E. DILLARD 2,638,082

THROTTLE CONTROL MEANS

Filed Jan. 14, 1950

Inventor
JAMES E. DILLARD

By Weatherford and Weatherford
Attorneys

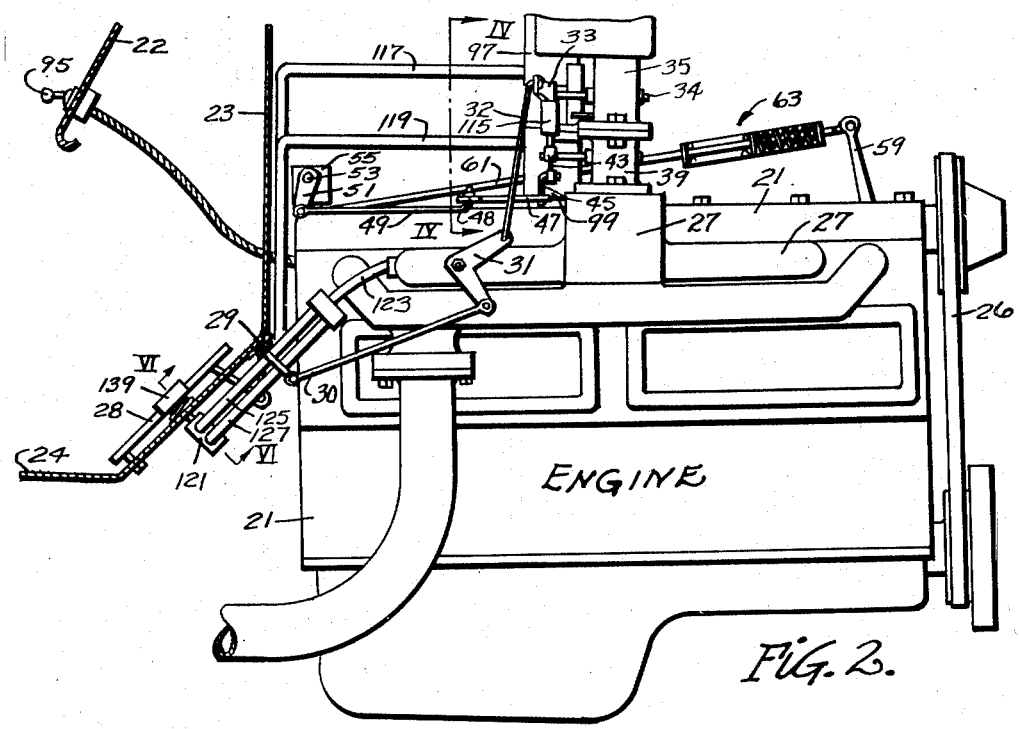
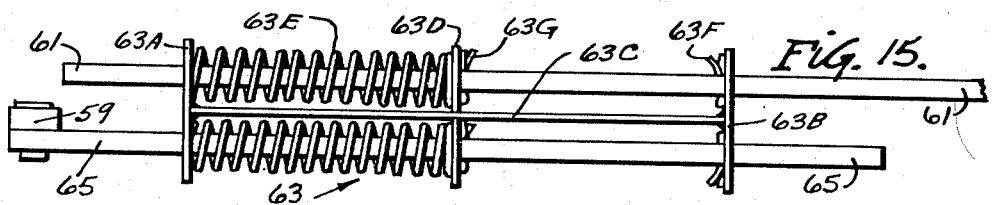
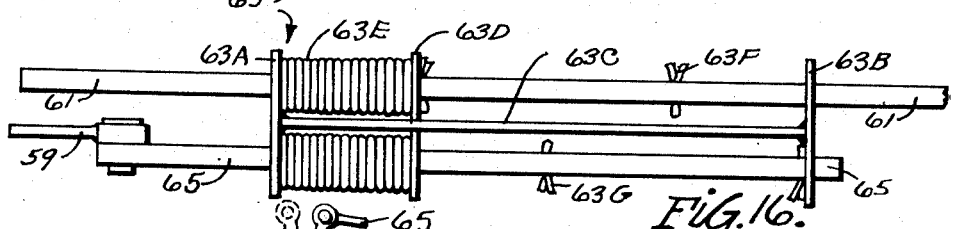
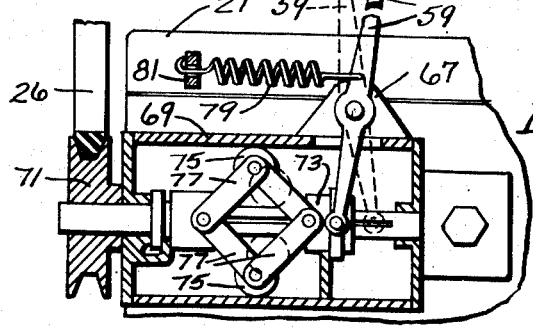

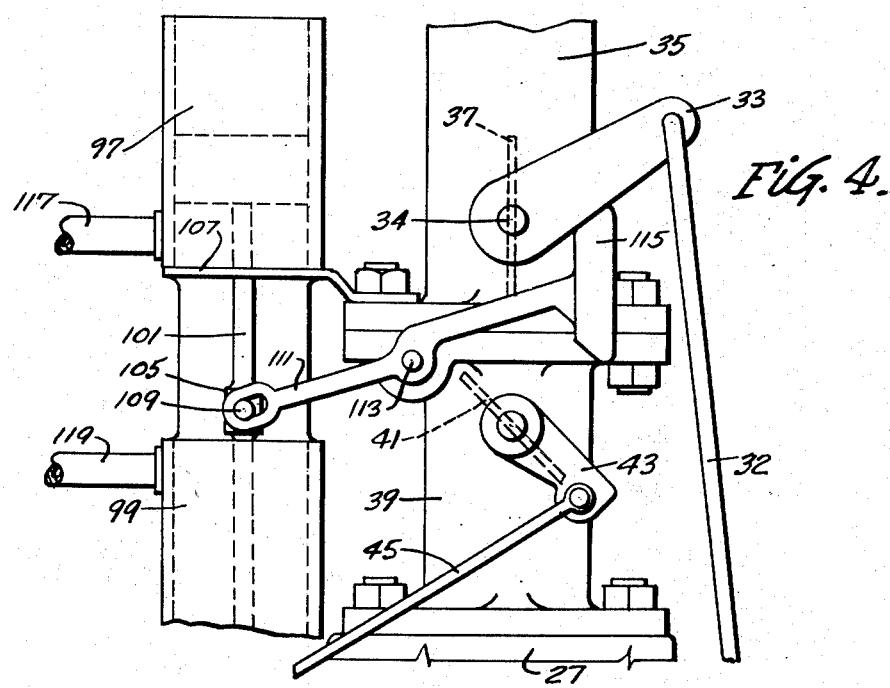
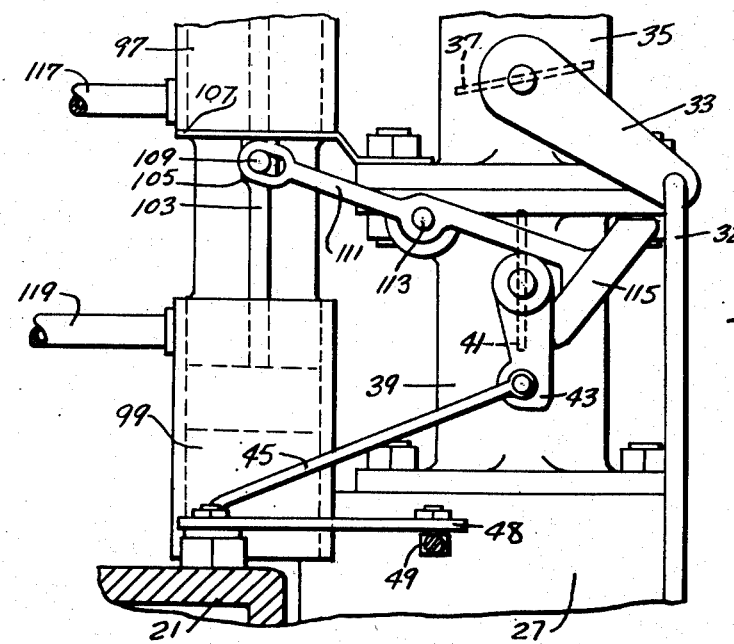

May 12, 1953
J. E. DILLARD
2,638,082
THROTTLE CONTROL MEANS
Filed Jan. 14, 1950
5 Sheets-Sheet 4
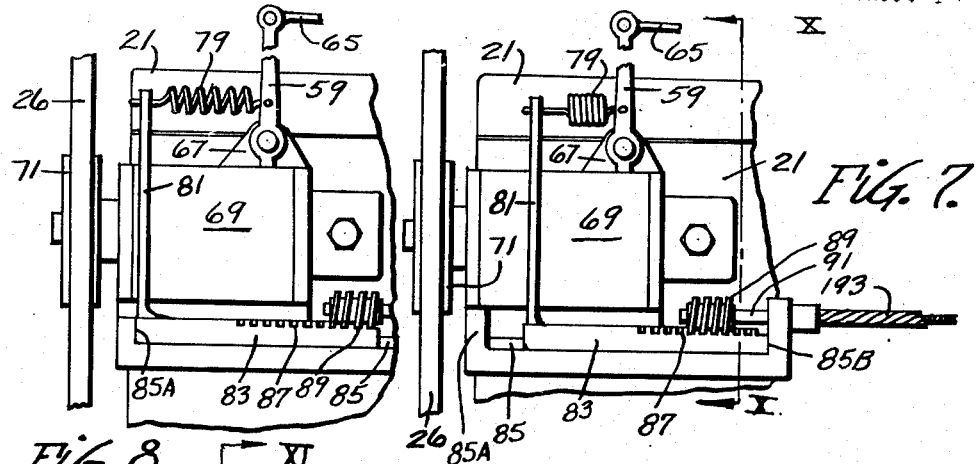
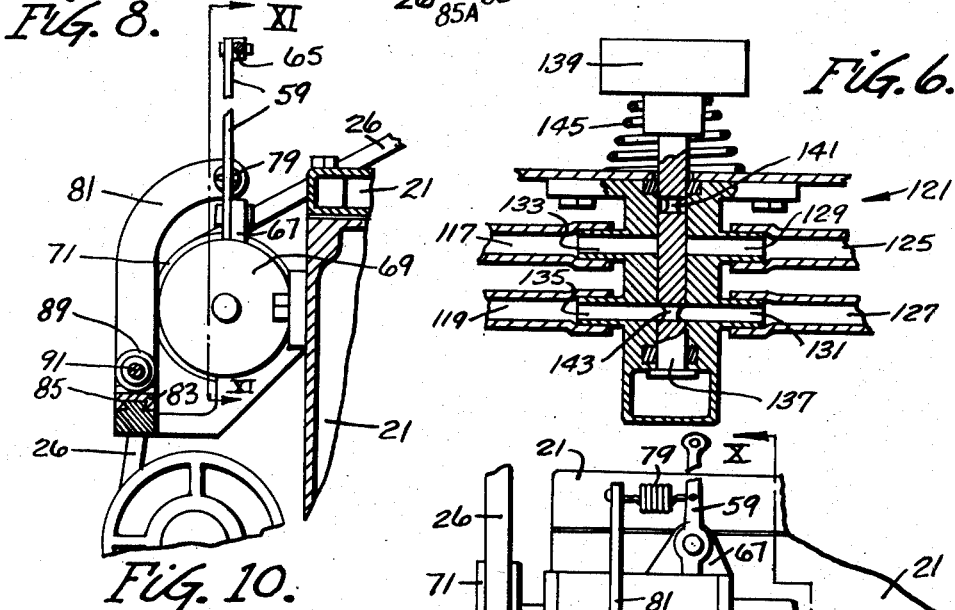
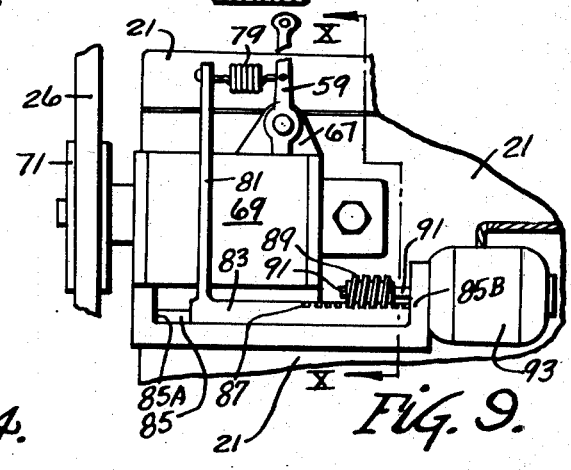
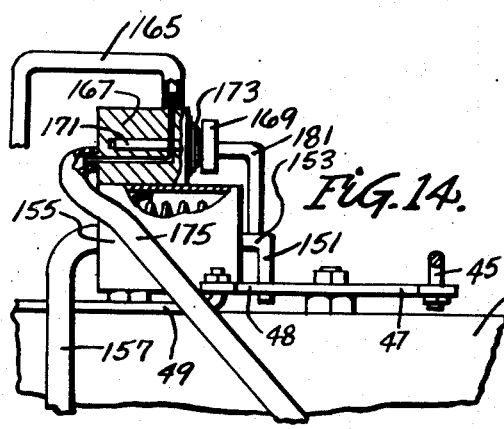
Inventor
JAMES E. DILLARD
By Weatherford and Weatherford
Attorneys May 12, 1953

J. E. DILLARD 2,638,082

THROTTLE CONTROL MEANS

Filed Jan. 14, 1950

Inventor
JAMES E. DILLARD
By Weatherford and Weatherford
Attorneys

Patented May 12, 1953

2,638,082

UNITED STATES PATENT OFFICE 2,638,082

THROTTLE CONTROL MEANS

James E. Dillard, Memphis, Tenn.

Application January 14, 1950, Serial No. 138,627

10 Claims. (Cl. 123—103)

This invention relates to certain new and useful improvements in means for throttle control in internal combustion engines, especially of the type commonly employed in automotive vehicles, and particularly relates to a new and novel arrangement in which the internal combustion engine is provided with a substantially conventional throttle valve and operating means and with a supplemental valve and governor means for the operation of the supplemental valve and includes means for selectively immobilizing the said valves.

The present invention is particularly useful in that it provides means for conventional control of an internal combustion engine, governor control means through which engine speed is maintained substantially level under changing load conditions, and control means by which shift may be immediately made from conventional control to governor control and return, enabling the operator of the engine to quickly and positively choose the one control desired to be used without impedance from the other.

The principal object of the invention is to provide throttle control means embodying the features just described.

A further object of the invention is to provide an engine having a pair of throttle valves, one of which is controlled by governor means, and vacuum operated means for selectively immobilizing the said valves so that one only of said valves is operable.

A further object of the invention is to provide an internal combustion engine with governor means and means for conveniently adjusting said governor to establish the speed at which the engine is to be maintained.

A further object of the invention is to provide a motor drive for such adjustment means.

And a further object of the invention is to improve the design, utility and efficiency of throttle control means for internal combustion engines.

The means by which the foregoing and other objects of the present invention are accomplished and the manner of their accomplishment will readily be understood from the following specification upon reference to the accompanying drawings, in which:

Fig. 2 is a similar view of the opposite side of the engine and throttle control means, illustrated in an operating position.

Fig. 4 is a fragmentary elevational view on an enlarged scale taken in the direction of the arrows IV—IV of Fig. 2, and illustrating details of the throttle valve immobilizing means as effective with one of the throttle valves.

Fig. 5 is a view similar to Fig. 4, illustrating the relation of parts with the throttle valve immobilizing means effective with the other of said throttle valves.

Fig. 6 is a fragmentary sectional view taken as one the line VI—VI of Figs. 1 and 2.

Fig. 7 is a fragmentary elevational view illustrating details of the governor adjustment means.

Fig. 8 is a view similar to Fig. 7 illustrating an adjusted position of the governor means.

Fig. 9 is a view similar to Fig. 7 illustrating motor driven governor adjusting means.

Fig. 10 is a fragmentary sectional view taken as on the line X—X of Figs. 7 and 9.

Fig. 11 is a fragmentary sectional view on the line XI—XI of Fig. 10, illustrating details of the governor employed.

Fig. 14 is a fragmentary elevational view on a similar enlarged scale further illustrating details of the arrangement shown in Fig. 12.

Fig. 15 is a top view on an enlarged scale of an overload member preferably employed in the device; and Fig. 16 is a view similar to Fig. 15 illustrating the overload member under overload.

Figure 1:
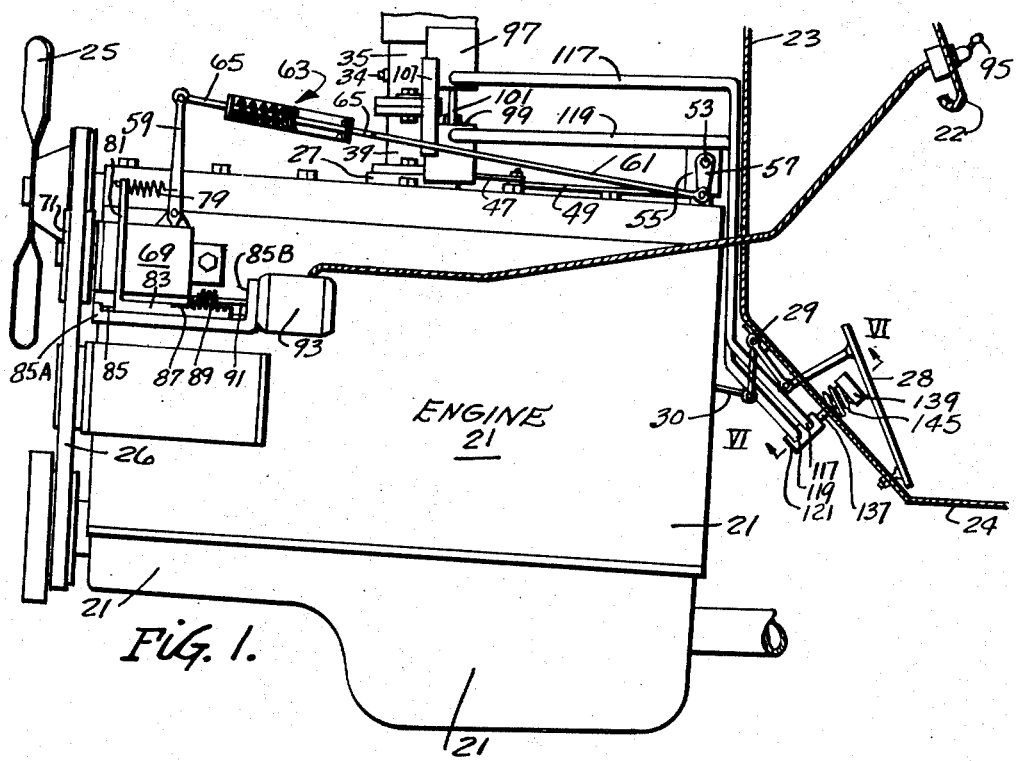
Fig. 1 is a side elevational view of the conventional internal combustion engine with the preferred form of throttle control means of the present invention applied thereto.
Figure 3:
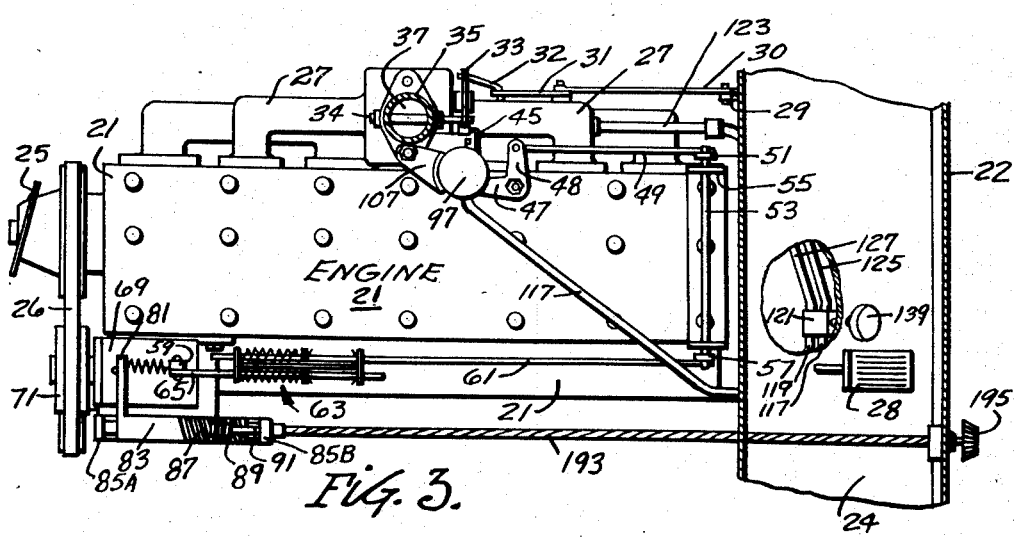
Fig. 3 is a top plan view of the engine and associated control means, including a variation in the governor adjustment means.

Referring now to the drawings in which the various parts are indicated by numerals, the present invention is illustrated as mounted on an engine 21 of conventional type employed in automobiles or other motor vehicles, certain portions of the vehicle being fragmentarily included for purposes of illustration. Thus the dashboard or instrument panel is indicated at 22 and the conventional fire wall is designated at 23 and includes a floor board 24. As is conventional, the engine is provided with a fan 25 driven by the engine through a suitable fan belt 26. The engine further includes an intake manifold 27. An accelerator foot pedal 28 is conventionally mounted on floor board 24 and is coupled by suitable linkage which includes a rocker 29, link 30, bell crank 31, and link 32 to a valve control arm 33 which is mounted on the extended end of a shaft 34 journalled in the side walls of an induction pipe 35 through which fuel for the engine flows, a conventional butterfly or gate valve 37, adapted for control of fuel flow, being mounted on the shaft 34 within the barrel of the induction pipe 35. Accelerator pedal 29 is so coupled to arm 33 through the linkage described that upon depression of pedal 28, arm 33 is raised and effects opening movement of valve 37, and reverse raising of pedal 28 effects closing movement of the valve.

Interposed between induction pipe 35 and manifold 27 is a supplemental pipe section 39 which effects an elongation of induction pipe 35. While it is preferred to employ supplemental pipe 39 as a separate section, mounting same in registered alinement with induction pipe 35, it will be understood that pipe 35 may be elongated as an integral unit without departing from this invention. Within section 39 a butterfly or gate valve 41, likewise adapted for control of fuel flow, is mounted in fashion similar to the mounting of valve 37 and is operated by an arm 43, the arm 43 being coupled by a link 45 to one leg 47 of a bell crank which is preferably rockably mounted on the upper exterior surface of engine 21 and has its opposite leg 48 coupled by a link 49 to an arm 51 mounted on one end of a shaft 53 extending transversely of and above engine 21 and being turnably supported in brackets 55 mounted on the upper face of the engine block. At its opposite end shaft 53 is provided with an arm 57, similar to arm 51, arm 57 being coupled, preferably by elongated composite linkage, to the upstanding end of a governor arm 59. Preferably the composite linkage consists of a rod 61 connected at its rearward end to arm 57 and extending forwardly therefrom and being coupled adjacent its forward end by an overload unit 63 to a forward rod 65, the forward end of rod 65 being coupled to the end of governor arm 59.

Overload unit 63 preferably consists of a substantially I-shaped member having forward and rearward flanges 63A, 63B, and a longitudinally extending central member 63C to which the flanges are rigidly attached as by welding. Intermediate the flanges 63A, 63B, a plate member 63D is slidably mounted on the central member 63C. Compression spring means 63E, preferably consisting of a pair of compression springs, are interposed between forward flange 63A and plate member 63D. The flanges 63A, 63B, and plate member 63D are apertured to slidably receive the rods 61, 65 in parallel spaced relation and rods 61, 65 are provided with stop members, such as cotter pins 63F, which are positioned to abut rearward flange 63B upon rearward movement of the rods and to thereby limit such rearward movement relative to the rearward flange 63B. The rods 61, 65 are also provided with intermediate stop members, such as the cotter pins 63G, positioned to abut the rearward face of plate member 63D and to thereby limit relative movement between the plate member and the rods. Preferably the spring members 63 surround the respective rods 61, 65.

Governor arm 59 is oscillatably supported intermediate its length by an ear 67, preferably formed in the upper exterior portion of the casing of a governor 69, governor 69 being rigidly mounted adjacent the forward portion of engine 21 and having a forwardly projecting drive pulley 71 drivingly engaged by fan belt 26. Governor arm 59 is operably coupled at its lower end to a slidable collar 73 of governor 69 which is preferably a centrifugally operated governor responding to the rotation imparted by engine drive of the fan belt, in substantially conventional manner, moving weights 75 outwardly in response to increase in engine speed, effecting expansion of toggles 77 and consequent movement of collar 73.

Coupled to the governor arm 59 is one end of a tension spring 79, the opposite end of the spring 79 being attached to a bracket 81 which preferably forms an upstanding integral part of a longitudinally disposed slide 83, slide 83 being slidably engaged for longitudinal movement with a guideway 85, slide 83 and guideway 85 being preferably dovetailed along their engagement. The upper face of slide 83 is provided with a rack 87, preferably having a suitable pitch for engagement by a worm 89, worm 89 being mounted on and rotatable by a shaft 91. Rotation of shaft 91 is preferably effected through a suitable reversible motor 93, supported by guideway 85, and electrically connected through leads to the battery or generator of the engine, this connection being well known so that it is not shown. Energization of the motor is effected through a switch 95, preferably conveniently located on dashboard 22. Preferably guideway 85 is provided with a forward shoulder 85A positioned for abutment by slide 83 upon forward movement of the slide to effect limitation of such forward movement. The guide also preferably includes a rearward shoulder 85B to similarly limit rearward movement of slide 83. Preferably shaft 91 for convenience is journalled in an upstanding portion of rearward shoulder 85B.

In some installations it is found desirable to provide for manual drive of worm shaft 91 and in such cases a flexible shaft 193 is attached to the worm shaft 91 and is provided at its opposite end with a hand knob 195 conveniently mounted on dashboard 22.

It will be seen that in the preferred installation described the lower end of governor arm 59 is moved forwardly and rearwardly responsive to movement of collar 73, movement of which is effected by movement of weights 75 and expansion or extension of toggles 77. As illustrated, the lower end of arm 59 is moved forwardly responsive to an increase in engine speed resulting in the outward displacement of weights 75 effecting a rearward movement of the upper end of arm 59 which is so coupled to valve 41 as to move valve 41 toward closing, consequently effecting a retarding in the flow through pipe 39 and a reduction in engine speed. Spring 79 resists rearward movement of the upper portion of arm 59 and consequently resists retarding of the engine speed and constantly urges forward movement of arm 59 toward engine acceleration. Through the provision of adjustable slide 83 the tension on spring 79 may be adjusted so as to increase or decrease the effect of the spring on the movement of the governor arm and consequently to effect an adjustment of the effect of the governor on throttle valve 41. The worm and rack arrangement provided for effecting adjustment of slide 83 and of the tension on spring 79 is found to be a particularly effective means for efficiently and conveniently accomplishing the desired adjustment whether manually driven through knob 195 and flexible shaft 193 or motor driven by motor 93.

In order to provide for the selection of throttle control means of which use is desired, means are provided for alternatively or selectively immobilizing the valves 37, 41. In the preferred embodiment of the invention the immobilizing means preferably include a pair of vacuum cylinders 97, 99, which are mounted vertically and in opposition and have their projecting rods 101, 103 alined and rigidly coupled as at 105. Preferably the opposed cylinders 97, 99 are supported from induction pipe 35 by a suitable bracket 107. Attached to and projecting outwardly from coupling 105 is a pin 109 to which is pivotally attached one end of an oscillatable arm 111. Arm 111 is pivotally supported intermediate its length by a pivot 113, preferably carried by the junction between induction pipe 35 and supplemental section 39. At its opposite end arm 111 is provided with a cam-like stop member 115 which lies in the plane of the respective valve arms 33, 43 and is positioned to alternately be moved into engagement with the arms upon oscillation of arm 111.

Vacuum cylinders 97, 99 are respectively connected by lines 117, 119 to a two-way valve 121 through which vacuum connection is alternately made to the respective cylinders from manifold 27 to employ the vacuum created in the manifold during engine operation. Preferably a vacuum line 123 is connected into manifold 27 and is provided with branch lines 125, 127. Branch lines 125, 127 are attached to nipples 129, 131 on one side of valve 121 and vacuum lines 117, 119 are coupled to nipples 133, 135 on the opposite side of valve 121. The valve is centrally bored and is provided with a valve stem 137 operable by a foot button 139, foot button 139 being preferably supported above floor board 124, adjacent accelerator pedal 28. Each of the nipples 129, 131, 133, 135 is communicated with the central bore of valve 121, with nipple 129 in registering alinement with nipple 133 and nipple 131 in registering alinement with nipple 135. Valve stem 137 is provided with a pair of ports 141, 143 which are spaced apart in excess of the spacing between the respective pairs of registering nipples, so that in the raised position of the valve as illustrated in Fig. 6, lower port 143 effects communication between nipples 131, 135 and consequently between branch line 127 and vacuum line 119, which valve stem 137 blocks communication between nipples 129, 133. Upon depression of valve stem 137 through foot button 139, upper port 141 is moved into register with nipples 129, 133 and simultaneously lower port 143 is moved out of registry with nipples 131, 135 so that vacuum communication between branch line 127 and vacuum line 119 is interrupted and vacuum communication between branch line 125 and vacuum line 117 is established. Preferably valve 121 is provided with a compression spring 145 interposed between foot button 139 and floor board 24, urging upward movement of the foot button and attached valve stem 137.

During operation of the engine, with the foot button in raised position, as shown in Fig. 6, and with vacuum communication thereby established from branch line 127 through nipple 131, port 143 and nipple 135 to vacuum line 119, vacuum cylinder 99 is operative, causing upward movement of piston rods 101, 103, vacuum cylinder 97 being simultaneously vented to atmosphere and being inoperative, the upward movement of the piston rods moving pin 109 and the attached end of arm 111 upwardly and lowering stop 115 into engagement with valve arm 43, moving valve arm 43 downwardly and effecting full opening of governor throttle valve 41, the valve being immobilized in this full open position by such engagement by stop 115 during the just described vacuum connections.

With the governor valve 41 thus held immobilized, throttle valve 37 is free for operation through accelerator pedal 28 and the linkage coupling the valve and pedal. As the engine speed is increased the governor weights 75 are centrifugally moved outwardly, as illustrated in Fig. 11, effecting movement of governor arm 59. Due to the restraint on valve arm 43 movement of the governor arm is ineffective to accomplish movement of governor valve 41 and this movement of the governor arm is absorbed in overload unit 63, as illustrated in Fig. 16.

When during engine operation it is desired to shift from foot pedal throttle control to governor control, the operator may conveniently depress foot button 139 and valve stem 137, moving upper port 141 into registry with nipples 129, 133 effecting vacuum communication between branch line 125 and vacuum line 117 and thence to vacuum cylinder 97. As this vacuum communication is established the previous vacuum communication to cylinder 97 is disrupted and cylinder 99 rendered inoperative, while cylinder 97 becomes effective to accomplish downward movement of piston rods 101, 103 and pin 109 carried thereby, effecting a reversal of the movement of arm 111 and consequent movement of stop 115 away from restraining engagement of arm 43 into engagement with valve arm 33. Valve arm 33 is raised by the upward movement of stop 115 and throttle valve 37 is moved to full open position and is held immobilized in that position while governor valve 41 is unrestrained and may be operated by governor 69 in the manner described.

It will be observed that as the shift from the position shown in Fig. 5, in which governor valve 41 is immobilized, to the position shown in Fig. 4, in which foot pedal valve 37 is immobilized, is begun, governor valve 41 is in full open position and as the opening of valve 37 proceeds full flow through induction pipe 37, 39 is permitted, accelerating the engine and consequently centrifugally affecting governor 69, moving weights 75 apart and thereby effecting governing movement of governor arm 59 toward retarding. Thereafter during operation the governor is effective to limit engine speed at the substantially constant rate. Thus if, due to an increase in load, the engine speed is reduced, the force exerted upon collar 73 by weights 75 and toggles 77 is reduced and spring 79 is enabled to move the upper end of governor arm 59 forwardly, effecting through the linkage described, opening movement of the unrestrained governor valve 41 and as the engine speed picks up the governor is effective to limit engine speed to the desired amount through effecting a partial closure of the governor valve.

It will be seen, as described, that the adjustment on the tension of spring 79 is effective to establish the governing limitations of governor 69 through the degree of limitation thereby placed upon the rearward movement of upper portion of governor arm 59.

Figure 12:
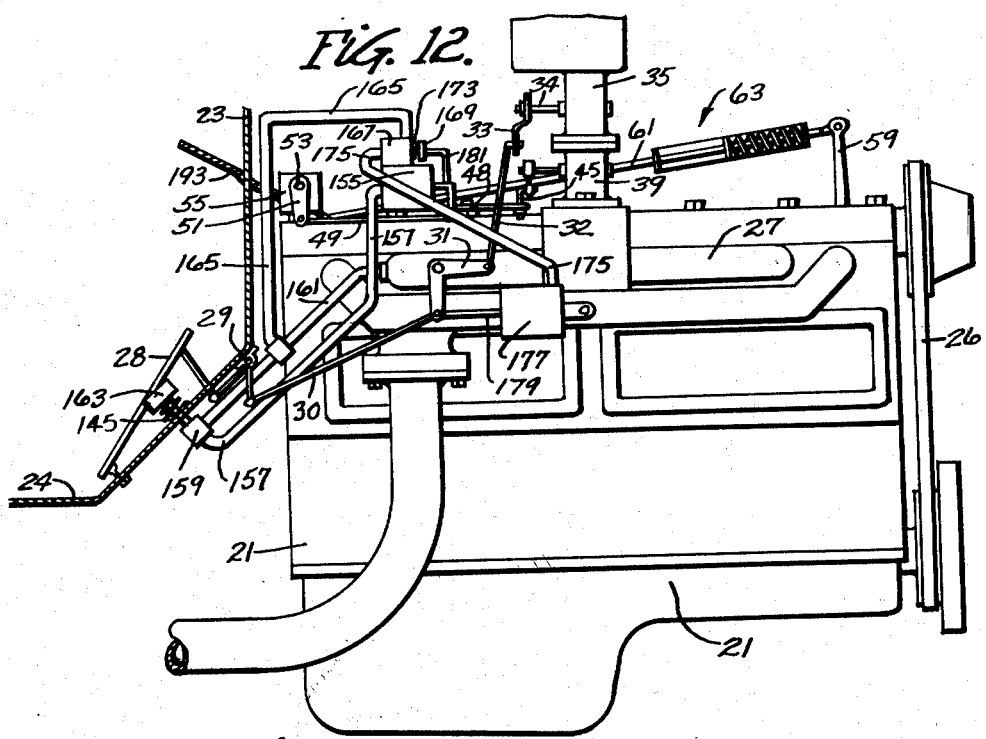
Fig. 12 is a side elevational view of an engine, illustrating a variation in the throttle control means.
Figure 13:
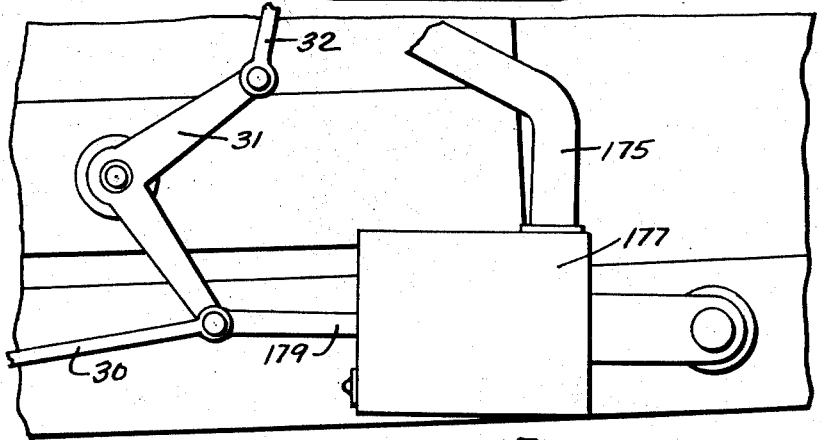
Fig. 13 is a fragmentary elevational view on an enlarged scale, illustrating details of the variation in throttle control means shown in Fig. 12.

In Figs. 12, 13 and 14 a variation in the vacuum controlled valve immobilizing means is illustrated. As there illustrated the accelerator pedal 28 is coupled by substantially identical linkage to throttle valve 37 and governor arm 59 is coupled through substantially identical linkage to governor valve 41. A stop member 151 is carried by the outer end of a piston rod 153 of a vacuum cylinder 155, this cylinder being preferably supported by a suitable bracket from the upper face of the engine block. Piston rod 153 is normally extended and cylinder 155 is provided with spring means urging such extension to position stop member 151 in abutting engagement with crank leg 48 of the governor valve linkage, holding the linkage with valve 41 open and effecting limitation on the movement of crank leg 48 and thereby interrupting the operation of the linkage between governor arm 59 and governor valve 41, so as to impede closure of valve 41 by the governor. Vacuum cylinder 155 upon operation is effective to retract piston rod 153 and stop 151 out of such limiting abutment with crank leg 48, and for operating purposes is coupled by a vacuum line 157 to one side of a one-way valve 159, the opposite side of the valve being connected by a vacuum line 161 to manifold 27. Valve 159 is provided with a depressible foot button 163 which is operable upon depression to effect opening of the valve and vacuum communication between vacuum lines 157, 161 and consequently between manifold 27 and vacuum cylinder 155.

A supplemental vacuum line 165 is branched from vacuum line 161 and connects to a valve 167, which is preferably mounted on the exterior of vacuum cylinder 155. Valve 167 is provided with a push button 169 and valve stem 171, the valve and stem being so ported and arranged that opening of the valve is accomplished only upon substantially complete travel of the valve stem under operation of the push button, whereas closure of the valve is effected by the initial portion of the return movement of the valve stem, the preferred embodiment of this arrangement being best illustrated in Fig. 14.

As indicated, push button 169 is preferably spring loaded by a spring 173 urging return of the push button to extended position and consequent closure of the valve. Coupled to the opposite side of valve 167 through a suitable nipple is a vacuum line 175 which communicates with a vacuum cylinder 177, cylinder 177 being supported from the exterior of the engine and being provided with a rod 179 operably coupled to the piston of the vacuum cylinder, and at its opposite end being coupled to the downwardly extending leg of crank 31 which forms part of the linkage coupling accelerator pedal 28 with valve 37. Upon operation of the vacuum cylinder 177, rod 179 is retracted, pulling with it the leg of crank 31 to which it is coupled, effecting raising of link 32 and arm 33 and opening of valve 37.

Compression of push button 169 is preferably effected by an abutment member 181 carried by piston rod 153 of vacuum cylinder 155, abutment member 181 preferably being angularly bent to form a rearwardly extending portion contacting the outer face of push button 169. It will be seen that in this variation during normal closed condition of valve 159 stop 151 is in abutting engagement with crank leg 48 inhibiting governor operation of governor valve 41, while valve 37 may be freely operated by accelerator pedal 28 through the intermediate linkage. When the operator desires to shift to governor control he may depress foot button 163, opening valve 159 and establishing vacuum communication into vacuum cylinder 155. Retraction of piston rod 153 is effected thereby accomplishing removal of the limitation on crank arm 48 by the rearward movement of stop 151 and simultaneously moving abutment member 181 against push button 169, the movement being continued until full retraction of piston rod 153 has been accomplished, at which time opening of valve 167 will be completed, establishing vacuum communication into vacuum cylinder 177. Upon operation vacuum cylinder 177 effects retraction of its rod 179 moving with it the downwardly extending leg of crank 31, effecting opening of valve 37 to full open position, in which position valve 37 is retained during vacuum operation of vacuum cylinder 177.

When the shift to foot pedal control is again desired the operator may release the pressure on foot button 163 interrupting the vacuum connection to vacuum cylinder 155, whereupon piston rod 153 and stop 151 and abutment 181 carried by the piston rod are returned to the original position. It will be noted that by the arrangement of valve 167 initial return movement of valve stem 171 is effective to interrupt vacuum communication to cylinder 177 so that the restraint upon throttle valve 37 is immediately released and control of engine speed through accelerator pedal 28 may be promptly taken over.

I claim:

1. In combination with an internal combustion engine having fuel induction pipe means, a pair of valves mounted in spaced relation in said pipe means movable to control fuel flow through said pipe means, operating means including a governor coupled to one of said valves, independent operating means coupled to the other said valve, valve immobilizing means shiftable from a position in which said immobilizing means restrainingly engage one of said operating means to a second position in which said immobilizing means restrainingly engage the other said operating means and return, each said restraining engagement limiting operation of the operating means engaged to substantially immobilize the valve coupled thereto without limiting the operation of the other said operating means, and control means for selectively shifting said immobilizing means from the first said position to said second position and return.

2. In combination with an internal combustion engine having fuel induction pipe means, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means movable from and to open position for control of fuel flow through said pipe means independent of the first said valve, a governor driven by said engine, linkage coupling said governor to said second valve for accomplishing movement of said second valve respectively responsive to increase and decrease in engine speed, valve immobilizing means including a stop member shiftable from and to a position in which it engages the linkage coupling said governor and said second valve, said stop member in said linkage engaging position abutting said linkage in open position of said second valve and limiting closing movement of said second valve, and a vacuum cylinder connected to said stop member to effect shift of said stop member from and to said linkage engagement, the first said linkage being unrestrained during said linkage engagement.

3. In combination with an internal combustion engine having fuel induction pipe means and a vacuum system, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means movable from and to open position for control of fuel flow through said pipe means independent of the first said valve, a governor driven by said engine, linkage coupling said governor to said second valve for accomplishing movement of said second valve respectively responsive to increase and decrease in engine speed, each said linkage including a valve control arm, said arms being respectively connected to said valves, a pair of opposed vacuum cylinders, each having a piston rod, said piston rods being alined and rigidly coupled, a pin carried by the piston rod coupling, an oscillatable arm pivotally supported exterior said pipe means and having one end coupled to said pin, a stop member mounted on the opposite end of said oscillatable arm, said oscillatable arm being shiftable from and to a position, in which said stop member engages one said valve control arm in open position of the valve connected thereto, to and from a position in which said stop member engages the other said valve control arm in open position of the other said valve, vacuum means connecting said cylinders with said engine vacuum system, and a vacuum control valve effective to alternately establish vacuum communication between said system and said cylinders respectively, vacuum communication to one of said cylinders effecting stop member shift into said engagement with one of said valve control arms, and vacuum communication to the other of said cylinders effecting stop member shift into said engagement with the other said valve control arm, each said valve control arm when engaged by said stop member being restrained in open position of its related valve while the other valve control arm and its related valve is unrestrained for operation by its linkage.

4. In combination with an internal combustion engine having fuel induction pipe means and a vacuum system, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means below the first said valve movable from and to open position for control of fuel flow through said pipe means independent of the first said valve, a governor driven by said engine, linkage coupling said governor to said second valve for accomplishing movement of said second valve respectively responsive to increase and decrease in engine speed, each said linkage including a valve control arm, said arms being respectively connected to said valves, upper and lower vacuum cylinders, vertically disposed in opposed relation, each having a piston rod, said piston rods being alined and rigidly coupled for vertical reciprocation, a pin carried by the piston rod coupling, an oscillatable arm pivotally supported exterior said pipe means and having one end coupled to said pin, a stop member mounted on the opposite end of said oscillatable arm, said oscillatable arm being shiftable from and to a position, in which said stop member is raised to engage the valve control arm of the first said valve in open position of said first valve, to and from a position in which said stop member is lowered to engage the other said valve control arm in open position of said governor operated valve, vacuum means connecting said cylinders with said engine vacuum system, and a vacuum control valve effective to alternately establish vacuum communication between said system and said cylinders respectively, vacuum communication to lower said cylinder effecting stop member shift into said engagement with the valve control arm of the first said valve, and vacuum communication to said upper cylinder effecting stop member shift into said engagement with said governor operated valve control arm, each said valve control arm when engaged by said stop member being restrained in open position of its related valve while the other valve control arm and its related valve is unrestrained for operation by its linkage.

5. In combination with an internal combustion engine having fuel induction pipe means and a vacuum system, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means movable from and to open position for control of fuel flow through said pipe means independent of the first said valve, a governor driven by said engine, linkage coupling said governor to said second valve for accomplishing movement of said second valve respectively responsive to increase and decrease in engine speed, the latter said linkage including a valve control arm connected to said second valve, a vacuum cylinder having a piston rod, a pin carried by said piston rod, an oscillatable arm pivotally supported exterior said pipe means and having one end coupled to said pin, a stop member mounted on the opposite end of said oscillatable arm, said oscillatable arm being shiftable from and to a position in which said stop member engages said valve control arm in open position of said second valve, vacuum means connecting said cylinder with said engine vacuum system, and a vacuum control valve effective to alternately establish and interrupt vacuum communication between said system and said cylinder, said vacuum communication to said cylinder effecting stop member shift into said engagement with said valve control arm, said valve control arm when engaged by said stop member being restrained in open position of said second valve.

6. In combination with an internal combustion engine having fuel induction pipe means, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means movable from and to open position for control of fuel flow through said pipe means independent of the first said valve, a governor driven by said engine, linkage coupling said governor to said second valve for accomplishing movement of said second valve respectively responsive to increase and decrease in engine speed, valve immobilizing means including a stop member shiftable from and to a position in which it engages the linkage coupling said governor and said second valve, said stop member in said linkage engaging position abutting said linkage in open position of said second valve and limiting closing movement of said second valve, a vacuum cylinder connected to said stop member to effect shift of said stop member from and to said linkage engagement, the first said linkage being unrestrained during said linkage engagement, and means for restraining said first linkage when said stop member is shifted out of engagement with said governor coupled linkage.

7. In combination with an internal combustion engine having fuel induction pipe means, a throttle valve mounted in said pipe means movable to and from open position for control of fuel flow through said pipe means, an accelerator pedal, linkage operably coupling said pedal and said valve for accomplishing valve movement responsive to pedal movement, a second throttle valve mounted in said pipe means movable from and to open position for control of fuel flow through said pipe means independent of the first said valve, a governor driven by said engine, linkage coupling said governor to said second valve for accomplishing movement of said second valve respectively responsive to increase and decrease in engine speed, and vacuum means associated with said linkages to selectively open and restrain the respective said valves.

8. In combination with pipe means, a pair of independent valves mounted in said pipe means in spaced relation and movable to and from open position for control of flow through said pipe means, operating means respectively coupled to said valves for accomplishing valve movement, and fluid pressure responsive means associated with the couplings for said valves to selectively open and restrain the respective said valves.

9. The combination of pipe means, a first valve mounted in said pipe means movable to and from open position for control of flow through said pipe means, means operably coupled to said valve for accomplishing valve movement, a second valve mounted in said pipe means movable from and to open position for control of flow through said pipe means independent of said first valve, operating means coupled to said second valve for accomplishing movement of said second valve, and vacuum means associated with the couplings for said valves to selectively open and restrain the respective said valves.

10. In combination with pipe means, a pair of independent valves mounted in said pipe means in spaced relation and movable to and from open position for control of flow through said pipe means, operating means respectively coupled to said valves for accomplishing valve movement, and vacuum means associated with the couplings for said valves to selectively open and restrain the respective said valves.

JAMES E. DILLARD.

References Cited in the file of this patent
UNITED STATES PATENTS

| Number | Name | Date |
|---|---|---|
| 1,587,969 | Ludeman | June 8, 1926 |
| 1,833,908 | Maybach | Dec. 1, 1931 |
| 1,860,286 | Johnson | May 24, 1932 |
| 2,131,950 | High | Oct. 4, 1938 |
| 2,136,023 | Russell | Nov. 8, 1938 |
| 2,152,226 | Vanderpoel et al. | Mar. 28, 1939 |
| 2,218,760 | MacNeil et al. | Oct. 22, 1940 |
| 2,250,982 | Adler | July 29, 1941 |
| 2,289,108 | Eaton | July 7, 1942 |
| 2,356,679 | Mallory | Aug. 22, 1944 |
| 2,443,084 | Rhodes | June 8, 1948 |
| 2,529,437 | Weinberger | Nov. 7, 1950 |